United States Patent
Aspin

(10) Patent No.: US 10,093,768 B2
(45) Date of Patent: Oct. 9, 2018

(54) FAST CURE EPOXY RESIN COMPOSITIONS

(71) Applicant: Cytec Industrial Materials (Derby) Limited, Heanor, Derbyshire (GB)

(72) Inventor: Ian Aspin, Derbyshire (GB)

(73) Assignee: Cytec Industrial Materials (Derby) Limited, Heanor (GB)

( * ) Notice: Subject to any disclaimer, the term of this patent is extended or adjusted under 35 U.S.C. 154(b) by 118 days.

(21) Appl. No.: 15/171,371

(22) Filed: Jun. 2, 2016

(65) Prior Publication Data

US 2016/0355635 A1 Dec. 8, 2016

(30) Foreign Application Priority Data

Jun. 2, 2015 (GB) .................................. 1509525.0

(51) Int. Cl.
| | | |
|---|---|---|
| B32B 27/38 | (2006.01) | |
| B32B 27/26 | (2006.01) | |
| B32B 27/04 | (2006.01) | |
| C08G 59/50 | (2006.01) | |
| C08L 63/00 | (2006.01) | |
| C08J 5/04 | (2006.01) | |
| C08G 59/56 | (2006.01) | |
| C08K 3/04 | (2006.01) | |
| C08K 7/06 | (2006.01) | |
| C08J 5/24 | (2006.01) | |

(52) U.S. Cl.
CPC ..... *C08G 59/5073* (2013.01); *C08G 59/5026* (2013.01); *C08G 59/56* (2013.01); *C08J 5/04* (2013.01); *C08J 5/042* (2013.01); *C08J 5/24* (2013.01); *C08K 3/04* (2013.01); *C08K 7/06* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 4,816,589 A | 3/1989 | Lin et al. | |
| 5,155,182 A | 10/1992 | Burba et al. | |
| 9,309,381 B2 * | 4/2016 | Patel ...................... | C08G 59/50 |
| 2006/0247341 A1 | 11/2006 | Hsieh et al. | |
| 2010/0280211 A1 | 11/2010 | Foo et al. | |
| 2012/0328811 A1 | 12/2012 | Patel et al. | |
| 2015/0240071 A1 | 8/2015 | Okamoto et al. | |
| 2016/0115283 A1 * | 4/2016 | Yin .................... | C08G 59/4021 |
| | | | 523/466 |

FOREIGN PATENT DOCUMENTS

| | | | | |
|---|---|---|---|---|
| CN | 102391807 A | * | 3/2012 | ............ C09J 163/00 |
| EP | 0239246 | | 9/1987 | |
| EP | 0457046 | | 11/1991 | |
| EP | 0540894 | | 5/1993 | |
| EP | 0540895 | | 5/1993 | |
| EP | 2246380 | | 11/2010 | |
| GB | 2265374 | | 9/1993 | |
| JP | 10218859 | | 8/1998 | |
| JP | 208098 | | 10/2011 | |
| WO | 9602764 | | 2/1996 | |
| WO | 2010122995 | | 10/2010 | |
| WO | 2011116050 | | 9/2011 | |
| WO | WO 2014/184012 A1 | * | 11/2014 | ............ C08G 59/40 |

OTHER PUBLICATIONS

Machine translation of CN 102391807 A (no date).*
STN registry data for 1-guanaminoethyl-2-methylimidazole (no date).*

* cited by examiner

*Primary Examiner* — Michael J Feely
(74) *Attorney, Agent, or Firm* — Thi Dang

(57) ABSTRACT

Disclosed herein is an epoxy resin compositions comprising an epoxy component and a curing agent component, wherein the curing agent component is at least an aminoalkylimidazole curing agent, and wherein the epoxy component and the curing agent component react together at a temperature of about 100° C. to about 130° C. to form a substantially cured reaction product in about 10 minutes or less. Further disclosed are composite products formed from such epoxy resin compositions.

7 Claims, No Drawings

FAST CURE EPOXY RESIN COMPOSITIONS

BACKGROUND OF THE INVENTION

This patent application claims priority to pending UK patent application Serial 1509525.0 filed Jun. 2, 2015 incorporated in its entirety herein by reference.

The present disclosure relates generally to an epoxy resin composition for manufacturing composite parts and, more particularly, to a fast curing epoxy resin composition suitable for use in high pressure resin transfer moulding applications.

It is well known that epoxy resin compositions or systems have a very valuable application in binding or impregnating various materials, such as glass fibres, carbon fibre mats or weaves, as well as other reinforcement materials. Manufacturing techniques for composite structures are also known and can vary. Practical conditions of moulding are fairly varied. In fact, there are different resin systems used for either high or low pressure moulding, for example, under partial vacuum to improve resin penetration into the reinforcement.

Resin transfer moulding ('RTM') is an increasingly common form of moulding wherein a catalysed, low viscosity resin composition is pumped into a mould under pressure, displacing the air at the edges, until the mould is filled. The mould can be packed with fibre preform or dry fibre reinforcement prior to resin injection. Once the mould is filled with resin, the resin cure cycle begins wherein the mould is heated to a temperature of about 100° C. or greater and the resin polymerizes to a rigid state.

In the automotive industry, high pressure resin transfer moulding ('HP-RTM') is one type of manufacturing solutions used by OEMs and their suppliers to manufacture automotive structures. Such equipment typically utilizes intelligent or computerized filling processes with closed loop control, as well as a high pressure metering system with sensor equipment for monitoring internal mould pressure. Using closed loop control, resin injection can be managed and controlled. After the mould is closed, a high compression force is applied and the resin is injected at a high pressure of about 30 to about 100 bar (atm), completing impregnation and curing the resin.

In order to meet manufacturing demands, the resin system used needs to have a cure time of about 10 minutes or less, preferably about 5 minutes or less at typical moulding temperatures of about 100° C. to about 130° C., and yield substantially fully cured composite parts having a resin glass transition temperature of greater than 130° C. without the use of a post cure or multifunctional resins. Resin systems used to manufacture such composite parts, particularly thermosetting polymer composite parts, prepared by a cross-linking reaction using an appropriate curing agent and epoxy resin, desirably have the following properties: (a) low viscosity suitable for HP-RTM (e.g., about 120 mPas or less at an injection temperature of about 120° C.); (b) fast cure reaction rate (e.g., about 5 minutes or less at 120° C. or about 3 minutes or less at 130° C.); (c) are substantially fully cured at the end of the reaction period (e.g., about 95 to 100% cured) and therefore do not require post-curing after moulding; and (d) have high resin Tg's (e.g., greater than about 120° C.) and high composite Tg's (e.g., greater than about 130° C.). One skilled in the art, however, recognizes that it is difficult to formulate epoxy resin compositions having all the properties desirable for manufacturing composite structures.

Different resin systems or formulations have been known and available for many years. These systems typically include one or more epoxy resins such as epoxy novolac resins and/or phenols such as those based on bisphenol-A ('BPA') and bisphenol-F ('BPF'), among others. However, the epoxy resin used can affect different properties of the resin system, such as the mechanical properties and viscosity of the system.

The resin formulation also includes a hardener or curing agent such as polyethyleneimine, cycloaliphatic anhydride, dicyanamide ('DICY'), imidazoles and amines such as diethylenetriamine ('DETA') and 1,3-bis(aminomethyl)cyclohexane ('1,3-BAC'). The resin formulation may also require an accelerator or catalyst for accelerating the reactivity of the curing agent with the epoxy. However, the combinations of epoxies, hardeners and catalyst can negatively affect properties noted above needed to work in HP-RTM moulding manufacturing processes. Therefore, there is a need for fast curing epoxy compositions suitable for use in HP-RTM manufacturing processes that meets the manufacturing requirements of low viscosity, fast cure and high resin Tg's. These needs are addressed by the embodiments of the present invention as described below and defined by the claims that follow.

SUMMARY OF THE INVENTION

Epoxy resin compositions according to the present invention include about 70 wt % to about 95 wt % by weight, based on weight of the composition, of an epoxy component. The composition further includes a curing component comprising about 5 wt % to about 30 wt % by weight of the composition, wherein the curing component is at least an aminoalkylimidazole curing agent. The epoxy component and the curing component react together at a temperature of about 100° C. to about 130° C. to form a substantially cured reaction product in about 10 minutes or less.

The aminoalkylimidazole curing agent comprises the following structure:

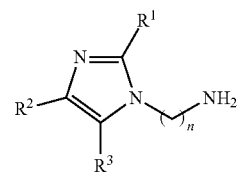

wherein $R^1$, $R^2$ and $R^3$ are each independently hydrogen, alkyl or aryl; and n is an integer from 2 to 6. Examples of suitable aminoalkylimidazole curing agents useful in the present invention include 1-(3-aminopropyl)-imidazole, 1-guanaminoethyl-2-methylimidazole, 1-aminoethyl-2-methylimidazole and mixtures thereof. In a preferred embodiment, the aminoalkylimidazole curing agent has a viscosity of about 120 mPas or less at a temperature of about 120° C.

In one embodiment according to the present invention, the epoxy resin composition can have a cured glass transition temperature $T_g$ of about 110° C. or greater.

The curing agent of the epoxy resin composition can further include—in addition to the aminoalkylimidazole curing agent—at least one hardener. When the composition include at least one additional hardener, this at least one hardener is present in an amount of about 1 wt % to about 25 wt % by weight of the resin composition, the aminoalkylimidazole curing agent is present in an amount of about 5 wt % to about 10 wt % by weight of the composition, and the epoxy component is present in an amount of about 70 wt % to about 94 wt % by weight of the composition. Examples of preferred additional hardeners include isophorone diamine ('IPDA'), 1,3-(bis(aminomethyl)cyclohexane ('BAC'), bis-(p-aminocyclohexyl)methane ('PALM'), diethylenetriamine ('DETA'), tetraethylenetriamine ('TETA'), tetraethylenepentamine ('TEPA') and 4,7,10-trioxatridecane-1,13-diamine ('TTD') and mixtures thereof.

The present invention further includes a composite product comprising a reaction product of an epoxy resin composition. The epoxy resin composition includes about 70 wt % to about 95 wt % by weight of the composition of an epoxy component; and a curing component comprising about 5 wt % to about 30 wt % by weight of the composition of an aminoalkylimidazole curing agent. The epoxy component and the aminoalkylimidazole react together at a temperature of about 100° C. to about 130° C. to form a substantially cured reaction product in about 10 minutes or less.

The composite product can further include a reinforcing fibre. Examples of suitable reinforcing fibres include woven or non-crimp fabrics, nonwoven webs or mats, fibre stands, staple fibre formed of continuous or discontinuous fibre and combinations thereof. Reinforcing fibres materials include fibreglass, carbon fibre, carbon nanotubes nano composite fibre, polyaramide fibre, poly(p-phenylene benzobisoxazole) fibre, ultrahigh molecular weight polyethylene fibre, high and low density polyethylene fibre, polypropylene fibre, nylon fibre, cellulose fibre, natural fibre, biodegradable fibre and combinations thereof.

In a preferred embodiment, the composite product has a glass transition temperature $T_g$ of about 130° C. or greater when cured.

DETAILED DESCRIPTION OF THE INVENTION

Provided herein are epoxy resin compositions, epoxy products and epoxy composite products having desirable thermal, physical and chemical properties. The epoxy resin composition includes the combination of an epoxy resin component and an aminoalkylimidazole curing agent component that provides needed thermal and chemical properties while maintaining the mechanical properties necessary for structural composite parts. Further, the uncured epoxy resin composition maintains a low viscosity and pot life typically required for composite fabrication. The epoxy resin composition of the present invention is suitable for fabricating composite parts by pultrusion, filament winding, resin infusion, hand lay-up, vacuum assisted resin transfer moulding ('RTM') and high pressure RTM ('HP-RTM'). The composition is especially adapted for HP-RTM due to its fast cure rate required for such processes.

As noted above, the epoxy resin composition includes an epoxy resin component and an aminoalkylimidazole curing agent component. The epoxy resin component can be present in an amount of about 50 wt % to about 95 wt % by weight of the composition. Preferably, the epoxy resin component is present in an amount of about 70 wt % to about 90 wt % by weight of the composition. The epoxy resin can be a single resin, or it can be a mixture or blend of mutually compatible epoxy resins.

Suitable epoxy resins include, but are not limited to, bi-functional epoxies, based on phenols such as 2,2-bis-(4-hydroxyphenyl)-propane (a/k/a bisphenol A) and bis-(4-hydroxyphenyl)-methane (a/k/a bisphenol F). These phenols can be reacted with epichlorohydrin to form the glycidyl ethers of these polyhydric phenols (e.g., bisphenol A diglycidyl ether, or DGEBA). Multifunctional epoxy resin, as utilized herein, describes compounds containing two (i.e., di-functional) or more (i.e., multi-functional) 1,2-epoxy groups per molecule. Epoxide compounds of this type are well known to those of skill in the art.

The epoxy component can be an aliphatic epoxy resin, which include glycidyl epoxy resins and cycloaliphatic (alicyclic) epoxide. Glycidyl epoxy resins include dodecanol glycidyl ether, diglycidyl ester of hexahydrophthalic acid, and trimethylolpropane triglycidyl ether. These resins typically display low viscosity at room temperature (10-200 mPa·s) and can be used to reduce the viscosity of other resins. Examples of suitable cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. The cycloaliphatic epoxides also display low viscosity at room temperature; however, their room temperature reactivity is rather low, and high temperature curing with suitable accelerators is normally required.

In another aspect, epoxy novolac resins, which are the glycidyl ethers of novolac resins, can be used as multifunctional epoxy resins in accordance with the present disclosure. Suitable epoxy novolac resins include polyepoxides (epoxy phenol novolac resin) and epoxy cresol novolac resin. These are typically highly viscous resins having a high epoxide functionality of around 2 to 6, providing high temperature and chemical resistance when cured but low flexibility.

The viscosity of the epoxy resin composition can be reduced by modifying the epoxy component. The epoxy component can comprise at least one multifunctional epoxy resin and/or one or more monofunctional epoxy resins. Monoepoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Other epoxy resins suitable for use in the present invention include higher functionality epoxies such as the glycidylamine epoxy resins. Examples of such resins include triglycidyl-p-aminophenol (functionality 3) and N,N,N,N-tetraglycidyl-4,5-methylenebis benzylamine (functionality 4). These resins are low to medium viscosity at room temperature, making them easy to process.

The curing agent can be present in an amount of about 30 wt % to about 5 wt % by weight of the composition. Preferably, the curing agent is present in an amount of about 10 wt % to about 5 wt % by weight of the composition.

The curing agent of the present epoxy resin composition is at least an aminoalkylimidazole. Aminoalkylimidazoles according to the present invention can comprise the following structure—

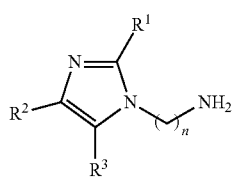

wherein $R^1$, $R^2$ and $R^3$ are each independently hydrogen, alkyl or aryl; and n is an integer from 2 to 6. Preferably, $R^1$, $R^2$ and $R^3$ are each independently hydrogen or $C_2$-$C_{14}$ alkyl. Examples of suitable aminoalkylimidazoles include 1-(2-aminoethyl)imidazole, 1-(3-aminopropyl)imidazole, 1-(3-aminopropyl)-2-methyl-1H-imidazole, 1-(3-aminopropyl)-2-ethyl-1H-imidazole, 1-guanaminoethyl-2-methylimidazole, 1-(2-aminoethyl)-2-methyl-1H-imidazole. Preferably, the aminoalkylimidazole is aminopropylimidazole.

In the epoxy resin composition according to certain embodiments of the present invention, the aminoalkylimidazole curing agent contains labile hydrogen that takes part in the reaction with the epoxy component and is considered to take part in the stoichiometric balance. Further, the aminoalkylimidazole curing agent provides a catalytic effect on the epoxy resin. As such, the aminoalkylimidazole curing agent serves the dual function of both catalyst and hardener.

In certain embodiments, the curing agent component can further comprise one or more hardeners in addition to the aminoalkylimidazole curing agent. For the purpose of the present application, a hardener refers to a blend of two or more curing agents. When the curing agent component of the epoxy resin composition further comprises one or more hardeners (i.e., in addition to the aminoalkylimidazole curing agent), the one or more hardeners are present in the composition in an amount of about 1 wt % to about 25 wt % by weight of the composition. Preferably, the one or more hardeners are present in the composition in an amount of about 5 wt % to about 10 wt % by weight of the composition. Suitable hardeners include aliphatic and cycloaliphatic amines such as isophorone diamine ('IPDA'), trimethylhexamethylene diamine, diethylenetriamine ('DETA'), triethylenetetramine ('TETA'), tetraethylenepentamine ('TEPA'), TCD-diamine, N,N-dimethylpropane-1,3-diamine, N,N-diethylpropane-1,3-diamine, 1,2-diaminocyclohexane, 1,3-diaminocyclohexane, 1,3-bisaminocyclohexylamine, 1,3-bis(aminomethyl)cyclohexane ('1,3-BAC'), 1,2-bis(aminomethyl)cyclohexane, 4,4'-methylenebis(cyclohexylamine), 4,4'-methylenebis(2-methylcyclohexylamine, N-aminoethylpiperazine, 4,7,10-trioxatridecane-1,13-diamine and other such poly(oxyalkyl) diamines. Other suitable mixed aryl-alkylamines include m-xylenediamine, p-xylenediamine, or aromatic amines such as 1,2-phenylenediamine, 1,3-phenylenediamine, and 1,4-phenylenediamine, diethyltoluenediamine ('DETDA'), 3,3'-diaminophenylsulfone ('33DDS'), 4,4'-diaminophenylsulfone ('44DDS'), and all curatives based on diaminodiphenylmethane ('DDM') such as 4,4'-methylenebis(isopropylmethylaniline) ('MMIPA'), 4,4'-methylenebis(chlorodiethylaniline) ('MCDEA'), 4,4'-methylenebis(diisopropylaniline) ('MDIPA'), 4,4'-methylenebis(diethylaniline) ('MDEA').

Epoxy resin compositions according to the present invention have a fast cure rate, making them suitable for HP-RTM. For epoxy resin compositions of the present invention, a fast cure rate refers to a cure time of about 10 minutes or less at a temperature of about 110° C. to about 150° C. Preferably, the epoxy resin compositions have a cure time of about 5 minutes or less at a temperature of about 120° C. to about 130° C.

According to certain embodiments, the epoxy system formulation for the composite may include one or more additives such as plasticizer(s), filler(s), processing aid(s), stabilizer, air release agent, internal mould release agent ('IMR'), viscosity modifier(s), UV absorbent agent, a flame retardant, and/or an impact modifier.

One embodiment of the present invention includes an epoxy composite. To form an epoxy composite, the epoxy resin composition includes reinforcing fibres. Reinforcing fibres for the fibre composite of the present disclosure may include customary fibres which are used for fibre reinforcement of materials. Suitable reinforcing fibres include organic or inorganic fibres, natural fibres or synthetic fibres, and may be present in the form of wovens or non-crimp fabrics, nonwoven webs or mats, and also in the form of fibre stands (rovings), or staple fibre formed of continuous or discontinuous fibre such as fibreglass, silicon carbide or disilicon carbide containing titanium fibre, carbon and/or graphite fibre, boron fibre, quartz, aluminium oxide, carbon nanotubes, nano composite fibres, polyaramide fibres, poly (p-phenylene benzobisoxazole) fibre, ultrahigh molecular weight polyethylene fibres, high and low density polyethylene fibres, polypropylene fibres, nylon fibres, cellulose fibres, natural fibres, biodegradable fibres and combinations thereof. Other suitable fibres include silicon carbide fibre; and silicon carbide fibres containing titanium.

These fibres (unidirectional, woven or non-woven) can be coated with the epoxy resin composition by standard impregnating methods such as filament winding, pultrusion, sheet moulding compound, bulk moulding compound autoclave moulding, resin infusion, vacuum assisted resin transfer moulding, hand lay-up, resin impregnation, prepreg, compression moulding, brushing, spraying, dipping, casting, injection moulding or combinations thereof.

Mixing of the curing component and the epoxy component to form the epoxy resin composition can be in any order and by any appropriate means known in the art for two component epoxy compositions. The mixing may be accomplished according to any known method for mixing, including, but not limited to, mixing by magnetic stirrers, high shear mixing, hand mixing, mechanical mixing or other suitable mixing method. The mixing of the curing component is preferably carried out at a temperature in the range of 0° C. to 150° C., preferably 30° C. to 60° C. Because of the high reactivity of the epoxy resin compositions of the present invention, it is preferred that the epoxy component and curing agent component are mixed by HP-RTM, metering the resin system through a high pressure mixing head into a pressurized mould. For safety reasons, outside of controlled equipment the mixing should occur at a temperature of 10° C. to 30° C.

EXAMPLES

Materials used in the Examples are described in Table 1—

TABLE 1

Materials

| Substance | Chemical Description and Source |
|---|---|
| API | N-(3-Aminopropylimidazole), available from BASF as Lupragen ® API. |

TABLE 1-continued

Materials

| Substance | Chemical Description and Source |
|---|---|
| IPDA | Isophorone diamine (cycloaliphatic diamine), available from Evonik Industries as Vestamin ® IPD. |
| EMI | 2-ethyl-4-methyl imidazole, available from Air Products as Imicure ® EMI-24. |
| CNI | 2-ethyl-4-methyl-1H-imidazole-1-propanenitrile, available from Air Products as Curimid ® CN. |
| Epoxy Resin R1 | Bisphenol A liquid epoxy resin, available from Huntsman as Araldite ® LY 1556. |
| Epoxy Resin R2 | Bisphenol A epoxy resin/epoxy phenol novolac resin 80:20 blend, available from Huntsman as Araldite ® LY 1556 and Araldite ® EPN 1138. |

Example 1

Preparation of Liquid Hardeners—

Liquid hardeners were prepared by mixing the hardeners together at room temperature in ratios according to the following Table 2—

TABLE 2

Composition of Liquid Hardeners (% mass)

| Name | IPDA | API | EMI | CNI |
|---|---|---|---|---|
| H1 | 0 | 100 | 0 | 0 |
| H2 | 25 | 75 | 0 | 0 |
| H3 | 50 | 50 | 0 | 0 |
| H4 | 75 | 25 | 0 | 0 |
| H5 | 100 | 0 | 0 | 0 |
| H6 | 0 | 0 | 100 | 0 |
| H7 | 25 | 0 | 75 | 0 |
| H8 | 50 | 0 | 50 | 0 |
| H9 | 75 | 0 | 25 | 0 |
| H10 | 0 | 0 | 0 | 100 |
| H11 | 25 | 0 | 0 | 75 |
| H12 | 50 | 0 | 0 | 50 |
| H13 | 75 | 0 | 0 | 25 |

Example 2

Uncured/Cured Properties of Resin/Hardeners Blends—

Resins and hardeners were mixed together at room temperature in ratios according to Tables 3 and 4. Cure behaviour was collected using both differential scanning calorimetry ('DSC') and dynamic mechanical analysis ('DMA', according to ASTM D7028). A cure cycle of 5 minutes at 120° C. was used for each blend. The cure behaviour results of the blends was as follows—

TABLE 3

DSC Cure Behaviour

| | | Uncured Resin Data | | | Cured Resin Data | | |
|---|---|---|---|---|---|---|---|
| Blend | Mix Ratio [1] | Tg (mid), ° C. | Reaction Peak, ° C. | Reaction Enthalpy (J/g) | Reaction Peak, ° C. | Reaction Enthalpy (J/g) | Degree of Cure (%) |
| R1, H1 | 20 | −21.5 | 125.7 | 502.0 | 149.6 | 21.0 | 96 |
| R1, H2 | 16 | −21.9 | 125.5 | 474.8 | 142.5 | 26.9 | 94 |
| R1, H3 | 12 | −22.8 | 124.7 | 517.4 | 142.0 | 13.5 | 97 |
| R1, H4 | 8 | −24.0 | 125.6 | 461.8 | 140.8 | 8.2 | 98 |
| R1, H5 | 5 | −25.0 | 113.2 | 403.7 | 138.7 | 97.5 | 76 |
| R1, H6 | 20 | −18.0 | 125.4 | 458.0 | 138.1 | 15.6 | 97 |
| R1, H7 | 16 | −17.6 | 125.7 | 460.4 | 141.1 | 12.0 | 97 |
| R1, H8 | 12 | −18.8 | 127.5 | 451.4 | 136.8 | 23.1 | 95 |
| R1, H9 | 8 | −20.8 | 130.9 | 434.4 | 140.1 | 13.6 | 97 |
| R1, H10 | 20 | −17.9 | 144.2 | 467.8 | 129.5 | 41.6 | 91 |
| R1, H11 | 16 | −17.8 | 144.1 | 449.8 | 133.1 | 30.2 | 93 |
| R1, H12 | 12 | −19.0 | 144.4 | 431.6 | 139.1 | 23.7 | 95 |
| R1, H13 | 8 | −22.2 | 147.0 | 428.6 | 123.5 | 74.0 | 83 |

[1] Mix ratios refer to number of parts resin per 1 part hardener.

As can be seen from the results in the above Table 3, the increase in API content enhances the cured properties and decreases the overall system cost over those that are observed for cycloaliphatic systems such as IPDA on their own.

TABLE 4

DMA Cure Behaviour

| | | Sample 1 | | | | Sample 2 | | | |
|---|---|---|---|---|---|---|---|---|---|
| Blend | Mix Ratio | E' Onset (° C.) | Notes* | Tan δ Peak (° C.) | Notes | E' Onset (° C.) | Notes | Tan δ Peak (° C.) | Notes |
| R1, H1 | 20 | 144.7 | — | 159.1 | Mt | 143.7 | — | 160.1 | — |
| R1, H2 | 16 | 145.4 | — | 157.2 | Mt | 144.1 | Mt | 157.7 | Mt |
| R1, H3 | 12 | 146.2 | Mt | 155.2 | — | 147.8 | Mt | 154.9 | Mt |
| R1, H4 | 8 | 135.7 | — | 149.8 | — | 135.2 | — | 148.6 | — |

TABLE 4-continued

DMA Cure Behaviour

| | | Sample 1 | | | | Sample 2 | | | |
| --- | --- | --- | --- | --- | --- | --- | --- | --- | --- |
| Blend | Mix Ratio | E' Onset (° C.) | Notes* | Tan δ Peak (° C.) | Notes | E' Onset (° C.) | Notes | Tan δ Peak (° C.) | Notes |
| R1, H5 | 5 | 74.5 | — | 96.3 | — | | | | |
| R1, H6 | 20 | 143.0 | — | 155.7 | — | 142.7 | Mr | 155.4 | Mt |
| R1, H7 | 16 | 141.4 | — | 154.8 | Mt | 142.5 | — | 154.6 | Mt |
| R1, H8 | 12 | 144.7 | Mr | 152.8 | Mt | 142.9 | Mr | 153.3 | Mt |
| R1, H9 | 8 | 140.6 | — | 150.8 | — | 139.7 | Mt | 149.3 | Mt |
| R1, H10 | 20 | 158.7 | Mt | 159.6 | Mt | 146.3 | Mr, Mt | 159.3 | Mt |
| R1, H11 | 16 | 148.3 | Mt | 160.4 | Mt | 148.9 | Mt | 159.7 | Mt |
| R1, H12 | 12 | 149.2 | Mt | 158.9 | Sh | 148.1 | Mr, Mt | 157.8 | Mt |
| R1, H13 | 8 | 143.1 | Mt | 156.3 | — | 141.3 | — | 156.2 | — |

*For the notes, Mr = 'modulus rise', Mt = 'minor transitions', and Sh = 'shoulder'.

The materials are approximately 35% resin on 2×2t/400 gsm/T700Sc/60E/12 k woven carbon fibre fabric.

From the above data it is seen that the reactivity of other typical "non-amino N-substituted imidazoles," such as 2-ethyl-4-methyl-1H-imidazole-1-propanenitrile (CNI in H10 to H13) are unsuitable as fast cure catalysts as they require twice as long to achieve a suitable degree of cure (>95%) than would be acceptable. This is due to their low reactivity, indicated by their high reaction peak temperature.

Imidazoles that are not N-substituted, such as 2-ethyl-4-methyl-imidazole (EMI, used in H6 to H9) are generally much more reactive and demonstrate high conversions and Tg's as shown by the above DSC studies (Table 3). Even so, the DMA data from cured laminates do not show even or complete cure as indicated by the many anomalous features in the graphs. These include modulus increases (indicating incomplete cure) or minor transitions where regions of less than optimum cured network structure can be found.

Unsubstituted ring N imidazoles are often crystalline solids and therefore require more complex blending. They also can increase the viscosity of the blend. Like N-substituted imidazoles, they are purely catalytic and do not form part of the stoichiometric balance as the API's do. In contrast, API's become an inextricable part of the cured matrix network due to reaction of the pendant primary amine group. In this regard, the pendant group on imidazole ring N of API's can be regarded as "making up" for unavailability of the imidazole ring N as in the cases of the N-substituted materials (e.g., CNI).

TABLE 5

Cured properties of mixtures of resin R1 and hardener blends H1-H5*

| System | IPDA:API % | Cured Tg (0°/90°) (° C.) | Degree of cure (%) | System mix ratio |
| --- | --- | --- | --- | --- |
| R1, H1 | 0:100 | 151/133 | 97 | 20:1 |
| R1, H2 | 25:75 | 150/134 | 95 | 16:1 |
| R1, H3 | 50:50 | 144/133 | 93 | 12:1 |
| R1, H4 | 75:25 | 138/127 | 95 | 8:1 |
| R1, H5 | 100:0 | NT | 77 | 5:1 |

Materials are approximately 30% resin on IMS65 stitched uni-directional ('UD') carbon fibre, cured at 120° C. for 5 minutes. Cured Tg was measured by DMA. NT='not tested'.

TABLE 6

Cured properties of mixtures of resin R2 and hardener blend H4 at various mix ratios and cure temperatures *

| | Cured Tg (0°/90°) (° C.) | | Degree of cure (%) | |
| --- | --- | --- | --- | --- |
| System mix ratio | 5 min/ 120° C. | 3 min/130° C. | 5 min/ 120° C. | 3 min/130° C. |
| R2, H1 4:1 | 118/102 | 115/98 | 100 | 100 |
| R2, H1 5:1 | 130/119 | 126/111 | 100 | 100 |
| R2, H1 6:1 | 139/126 | 135/117 | 99.7 | 99.9 |
| R2, H1 7:1 | 143/132 | NT | 98.0 | NT |
| R2, H1 8:1 | 147/133 | NT | NT | NT |

Materials are approximately 30% resin on IMS65 stitched UD carbon fibre, cured at 120° C. for 5 minutes. Cured Tg was measured by DMA. NT='not tested'.

TABLE 7

Cured composite properties derived from the use of API in hardener blends

| System | IMR (%) | Cured Tg (0°) ° C. | Fabric (carbon fibre) |
| --- | --- | --- | --- |
| C1 | 0 | 140 | 2 × 2t/400 gsm/T700SC/60E/12k |
| C2 | 1 | 137 | 2 × 2t/400 gsm/T700SC/60E/12k |
| C3 | 2 | 135 | 2 × 2t/400 gsm/T700SC/60E/12k |
| C4 | 0 | 146 | NCF 400 gsm/±45/STS 40 F13 24K |
| C5 | 0 | 148 | NCF 600 gsm/±45/STS 40 F13 24K |

Materials are approximately 45% resin. Cure cycle=5 min/120° C. Cured Tg measured by DMA.

Table 7 illustrates that API-containing resin compositions give improved results on heavy fabric such as 400 gsm and 600 gsm NCF's (C4 and C5) suitable for use in applications such as serial auto manufacture, as well as lighter weight fabrics (C1-C3) suitable for use in applications such as aerospace manufacture. Table 7 further illustrates that adding up to 2% internal mold release agent ('IMR')—a substantially large amount versus normal application—the composition still achieves an improved Tg of 135° C.

While the invention has been described with reference to a preferred embodiment, it will be understood by those skilled in the art that various changes may be made and equivalents may be substituted for elements thereof without departing from the scope of the invention. Further, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An epoxy resin composition comprising:
an epoxy component; and
a curing component consisting of (a) an aminoalkylimidazole curing agent represented by the following structure:

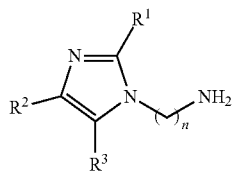

wherein $R^1$, $R^2$ and $R^3$ are each independently hydrogen, alkyl or aryl; and n is an integer from 2 to 6, and
(b) a hardener chosen from isophorone diamine (IPDA), 1,3-(bis(aminomethyl) cyclohexane (BAC), bis-(p-aminocyclohexyl)methane (PACM), diethylenetriamine (DETA), triethylenetetraamine (TETA), tetraethylenepentamine (TEPA), 4,7,10-trioxatridecane-1,13-diamine (TTD) and mixtures thereof;
wherein the epoxy component is present in an amount of 70 wt % to 94 wt % by weight of the composition, the aminoalkylimidazole curing agent is present in an amount of 5 wt % to 10 wt % by weight of the composition, and the hardener is present in an amount of 1 wt % to 25 wt % by weight of the composition; and
wherein, upon curing at a temperature of about 100° C. to about 130° C., the epoxy component and the curing component react together to form a substantially cured reaction product in about 10 minutes or less.

2. The epoxy resin composition of claim 1, wherein the aminoalkylimidazole curing agent is 1-(3-aminopropyl)-imidazole or 1-aminoethyl-2-methylimidazole.

3. The epoxy resin composition of claim 1 wherein the epoxy component comprises a single epoxy resin or a blend of epoxy resins.

4. A composite product comprising reinforcing fibres impregnated with the epoxy resin composition of claim 1.

5. The composite product of claim 4, wherein the reinforcing fibres are in the form of woven or non-crimp fabrics, or nonwoven webs or mats.

6. The composite product of claim 4, wherein the reinforcing fibres are chosen from fibreglass, carbon fibres, polyaramide fibres, poly(p-phenylene benzobisoxazole) fibres, polyethylene fibres, polypropylene fibres, nylon fibres, and combinations thereof.

7. A cured composite product derived from curing the composite product of claim 4, wherein the cured product has a glass transition temperature $T_g$ of about 130° C. or greater.

* * * * *